Patented Apr. 20, 1937

2,078,092

UNITED STATES PATENT OFFICE 2,078,092

PRODUCTION OF SODIUM HYDROXIDE FROM SODIUM SESQUI-CARBONATE

Robert B. MacMullin and George Lewis Cunningham, Niagara Falls, N. Y., assignors to The Mathieson Alkali Works, Inc., New York, N. Y., a corporation of Virginia No Drawing. Application July 6, 1932, Serial No. 621,056

6 Claims. (Cl. 23—185)

This invention relates to improvements in the production of sodium hydroxide from sodium sesquicarbonate, and, more particularly, to a process wherein the sodium sesquicarbonate is decarbonated prior to the causticization step. These improvements afford important economies in the operation of the process.

This invention relates to improvements in the decarbonation of sodium sesquicarbonate, $$NaHCO_3 \cdot Na_2CO_3 \cdot 2H_2O.$$

These improvements afford important economies in operations for the production of sodium hydroxide, sodium carbonate decahydrate and sodium carbonate monohydrate, for example, from sodium sesquicarbonate.

In sodium sesquicarbonate the molecular ratio $CO_2:Na$ is 0.666 while in sodium carbonate this ratio is 0.5. Thus, for the production of sodium hydroxide from sodium sesquicarbonate by causticization with lime, one-third more lime is required for the causticization than with sodium carbonate.

According to the present invention, sodium sesquicarbonate to be decarbonated is subjected to the action of an amount of water limited to effect the precipitation of sodium bicarbonate and the sodium bicarbonate so precipitated is separated from the solution to produce a solution in which the molecular ratio $CO_2:Na$ is lower than in sodium sesquicarbonate, the precipitated and separated sodium bicarbonate, $NaHCO_3$, having a molecular ratio $CO_2:Na$ of 1.00. The water may be supplied to the reaction as water or, for example, as an aqueous solution of sodium chloride. Sodium carbonate solutions having a molecular ratio $CO_2:Na$ as low as .565 may be thus produced. The molecular ratio $CO_2:Na$ of the solution produced by the operation of the invention depends, primarily, upon the temperature at which the operation is carried out. In general, the lower the temperature, the lower will be the ratio $CO_2:Na$, down to a lower limit of about 0.565 at a temperature of 17°–20° C. Temperatures of 17°–20° C. are particularly advantageous, although temperatures of 17°–45° C. are also advantageous. At 35° C., the ratio $CO_2:Na$ approximates 0.57, at 45° C. it approximates 0.59 and at 60° C. it approximates 0.61. The amount of water used is with advantage limited to precipitate a maximum proportion of sodium bicarbonate, and the ratios $CO_2:Na$ just mentioned are to be obtained using such amounts of water.

In the present invention the sodium sesquicarbonate is subjected to the action of an amount of water limited to effect the precipitation of sodium bicarbonate. This amount of water may be expressed in terms of the ratio $$H_2O:NaHCO_3 \cdot Na_2CO_3 \cdot 2H_2O$$

by weight. The maximum proportion of water to sodium sesquicarbonate above which no $NaHCO_3$ can be precipitated follows:

| Temperature ° C. | Weight ratio 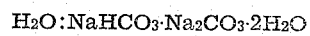 $H_2O:NaHCO_3 \cdot Na_2CO_3 \cdot 2H_2O$ |
|---|---|
| 0 | 7.34 |
| 15 | 5.9 |
| 30 | 4.6 |
| 45 | 3.56 |
| 60 | 3.04 |

The minimum ratio of water to sodium sesquicarbonate is 1.89 at 17° C. and 0.64 at 0° C.

The invention will be illustrated by the following specific examples:

I. 75.3 parts (by weight) of sodium sesquicarbonate are treated with 160 parts of water at 20° C. 19.7 parts of sodium bicarbonate are precipitated and separated from the liquor by filtration. That is, about 23.5% of the Na content of the sodium sesquicarbonate supplied to the operation is separated as sodium bicarbonate. After separation of the sodium bicarbonate, the liquor has a molecular ratio $CO_2:Na$ approximating 0.565.

II. 75.3 parts of sodium sesquicarbonate are treated with 380.5 parts of an aqueous solution of sodium chloride containing 15.4% NaCl at 30° C. 15.8 parts of sodium bicarbonate are precipitated and separated from the liquor by filtration. That is, about 18.9% of the Na content of the sodium sesquicarbonate supplied to the operation is separated as sodium bicarbonate. After separation of the sodium bicarbonate, the liquor has a molecular ratio $CO_2:Na$ approximating 0.59.

The liquors produced according to these two examples are subjected to further treatment for the production of sodium hydroxide, as first mentioned, by causticization with lime in any conventional manner. In this way, the efficiency of the process is increased since, as pointed out above, the amount of lime required for causticization of these resulting liquors is markedly less than would be required for the causticization of the original sesquicarbonate.

The sodium bicarbonate separated in the operation in itself constitutes a useful product. It may, however, be reconverted to sodium sesquicarbonate, for example, as described in an application filed March 30, 1932, Serial Number 601,-

992, by us with Homer L. Robson, or as described in an application filed September 19, 1932, Serial Number 633,854 by us. Sodium sesquicarbonate so produced may of course be subjected to the operation of the invention, the operation being thus made cyclic.

We claim:

1. In the production of sodium hydroxide from sodium sesquicarbonate, the improvement comprising decarbonating the sodium sesquicarbonate by subjecting it to the action of an amount of water limited to effect the precipitation of sodium bicarbonate, separating the precipitated sodium bicarbonate, and causticizing the remaining liquor with lime.

2. In the production of sodium hydroxide from sodium sesquicarbonate, the improvement comprising decarbonating the sodium sesquicarbonate by subjecting it to the action of an amount of an aqueous solution of sodium chloride limited to effect the precipitation of sodium bicarbonate, separating the precipitated sodium bicarbonate, and causticizing the remaining liquor with lime.

3. In the production of sodium hydroxide from sodium sesquicarbonate, the improvement comprising decarbonating the sodium sesquicarbonate by subjecting it to the action of an amount of water limited to effect the precipitation of sodium bicarbonate and to effect the production of a sodium carbonate solution having a $CO_2$:Na ratio less than 0.666 and at least as high as 0.565, separating the thus precipitated sodium bicarbonate uncontaminated with other salts, and causticizing the remaining liquor with lime.

4. In the production of sodium hydroxide from sodium sesquicarbonate, the improvement comprising decarbonating the sodium sesquicarbonate by subjecting it to the action of an amount of aqueous solution of sodium chloride limited to effect the precipitation of sodium bicarbonate and to effect the production of a sodium carbonate solution having a $CO_2$:Na ratio less than 0.666 and at least as high as 0.565, separating the thus precipitated sodium bicarbonate uncontaminated with other salts, and causticizing the remaining liquor with lime.

5. In the production of sodium hydroxide from sodium sesquicarbonate, the improvement comprising decarbonating the sodium sesquicarbonate by subjecting it to the action of an amount of water limited to effect the precipitation of sodium bicarbonate and to effect the production of a sodium carbonate solution having a $CO_2$:Na ratio less than 0.666 and at least as high as 0.59 while maintaining a temperature of 17°–45° C., separating the thus precipitated sodium bicarbonate uncontaminated with other salts, and causticizing the remaining liquor with lime.

6. In the production of sodium hydroxide from sodium sesquicarbonate, the improvement comprising decarbonating the sodium sesquicarbonate by subjecting it to the action of an amount of water limited to effect the precipitation of sodium bicarbonate and to effect production of a sodium carbonate solution having a $CO_2$:Na ratio less than 0.666 and at least as high as 0.565 while maintaining a temperature of 17°–20° C., separating the thus precipitated sodium bicarbonate uncontaminated with other salts, and causticizing the remaining liquor with lime.

ROBERT B. MacMULLIN.
GEORGE LEWIS CUNNINGHAM.